United States Patent [19]
Maliszewski

[11] Patent Number: 6,021,487
[45] Date of Patent: *Feb. 1, 2000

[54] METHOD AND APPARATUS FOR PROVIDING A SIGNED INTEGER DIVIDE BY A POWER OF TWO

[75] Inventor: Richard L. Maliszewski, Gresham, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,069

[22] Filed: Dec. 16, 1996

[51] Int. Cl.$^7$ .................................................. G06F 9/302
[52] U.S. Cl. .......................... 712/221; 712/235; 708/650
[58] Field of Search ..................................... 712/221, 222, 712/234, 235; 395/706; 708/524, 525, 504, 507, 653–656, 490, 508, 650

[56] References Cited

U.S. PATENT DOCUMENTS

| | | | |
|---|---|---|---|
| 5,257,215 | 10/1993 | Poon | 708/204 |
| 5,272,660 | 12/1993 | Rossbach | 708/504 |
| 5,559,977 | 9/1996 | Avnon et al. | 712/244 |
| 5,638,314 | 6/1997 | Yoshida | 708/656 |

*Primary Examiner*—Viet D. Vu
*Attorney, Agent, or Firm*—Blakely, Sokoloff, Taylor & Zafman LLP

[57] ABSTRACT

A method and apparatus to divide a signed integer by a constant power of two using conditionally-executed instructions to choose between a first result in the event that the dividend is a negative signed integer and a second result in the event that the dividend is a positive signed integer, wherein values associated with the first result and the second result are generated simultaneously.

34 Claims, 5 Drawing Sheets

METHOD AND APPARATUS FOR PROVIDING A SIGNED INTEGER DIVIDE BY A POWER OF TWO

FIELD OF THE INVENTION

The present invention generally relates to code sequences in compilers and, most particularly, relates to division of a signed integer by a power of two.

BACKGROUND OF THE INVENTION

Generally, a compiler is a computer program that translates programs expressed in a high-order language to their machine language equivalents. In the language conversion process, a Signed Integer Divide (SID) may be performed. By its nature, the result of a SID may have to be rounded.

Figure 1:
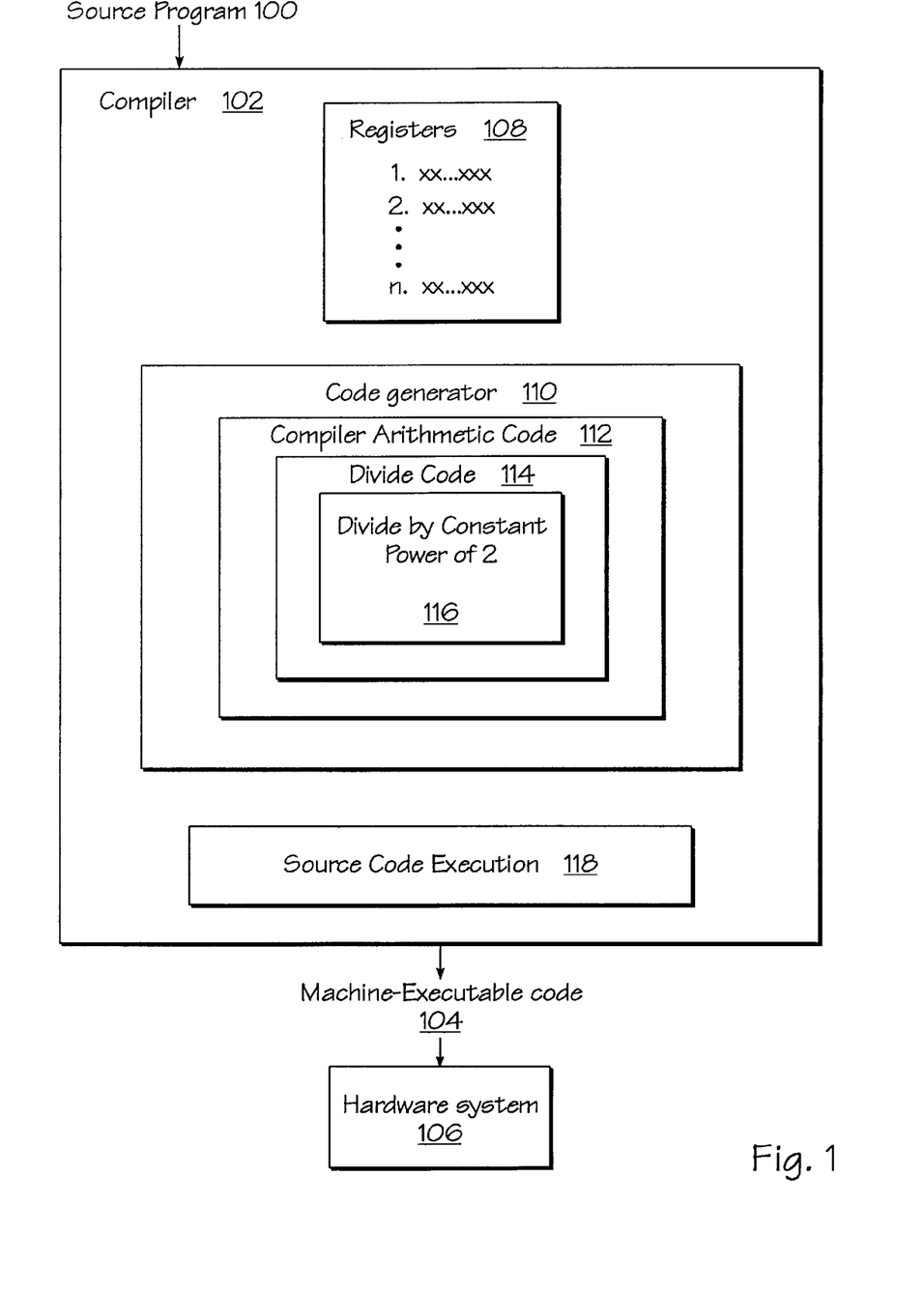
FIG. 1 is a general block diagram of a computer system incorporating one embodiment of the present invention.

Referring to FIG. 1, a typical compiler in its relation to a computer system is shown. First, a source program 100 is input into the compiler 102 where it is therein converted to machine executable code 104 for use in a computer's hardware system 106. Associated with the compiler 102 are typically a set of registers 108 for transferring numeric values in and out, a code generator 110 for generating compiler arithmetic code 112 that includes divide code 114 which further includes a code for dividing by a constant power of two 116, and also source code execution circuitry 118. Each of these features allows the compiler 102 to reduce the source code in source code RAM 100 to machine executable code 104 for use in the hardware system 106.

When dividing integers, rounding occurs to the nearest whole number, rounding toward zero. Thus, for a positive number, a small offset is generally subtracted from the number. In the case of a negative number, a small offset is generally added in order to round the number. This function can be performed in many ways.

One way to perform SIDs is to use branch logic along with a "true" divide operation. For example, if the input is positive, then a first sequence of instructions would be executed, otherwise, if the input is negative, then a second sequence of instructions would be executed. Executing a true floating point or integer divide, however, can take a number of clock cycles to complete. This can slow down a processor or computer system greatly.

The key, however, is that the divisor is always a power of two, i.e., $R^{2N}$. Therefore, it is better to perform a logic or arithmetic shift of a register rather than performing a true divide. Integer shifts are single clock instructions on all conventional machines and, therefore, are a great advantage over doing true divides.

Trouble occurs, however, when a signed integer is divided. In the situation of a negative signed number, simply shifting the integer number will not produce the correct result. A negative number will need to be modified in order to take advantage of shifting to divide the number by a power of two.

One method to address the problem(s) associated with signed numbers is to precondition the inputs. Below is a conventional "optimized" code sequence that divides a number (R0) by a power of two ($2^N$) and places the result in a register (R1). "S" is the size in bits of the registers involved. All four instructions are serialized in that each depends on the prior instruction's result. "N" is a compile-time known constant. Four clock cycles are required for this sequence. The code sequence is as follows:

| | | | |
|---|---|---|---|
| 1) shift-right-arithmetic | T1=R1, N-1 | ;; | produces N copies of the signed bit |
| 2) shift-right-log | T2=T1, S-N | ;; | moves the N copies of sign bit to least-significant bits |
| 3) add | T3=R1, T2 | ;; | adds fudge factor to original input |
| 4) shift-right-arithmetic | R2=T3, N | ;; | shifts fudged value, giving result |

The sequence, although optimized, requires at least four clock cycles to complete since each instruction depends on the prior instructions' result.

Figure 2:
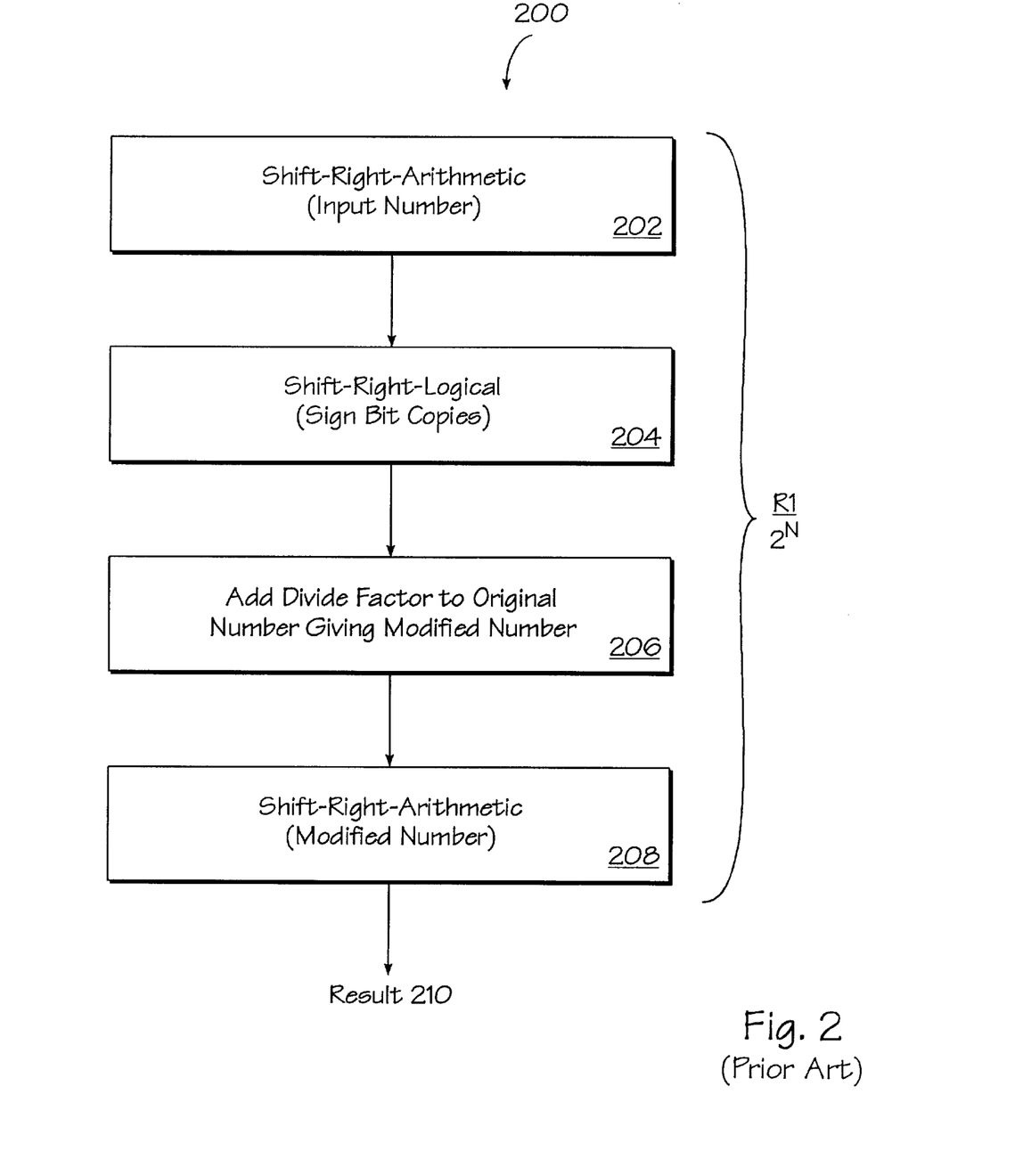
FIG. 2 is a flow diagram of a conventional method to divide a signed integer by a power of two that is well known and practiced in the art.

Now referring to FIG. 2, the optimized sequence for dividing a signed integer by a power of two ($R1/2^N$) 200 is shown in a flow diagram. The basic concept is to generate a value based on "N" to be added to the original dividend so that performing the arithmetic-right-shift by N produces the correct result when the dividend is a negative number. This value, or dividing factor, is a positive ($2^N-1$) if the dividend is a negative integer. The dividing factor is zero if the dividend is a positive integer.

Still referring to FIG. 2, the first step 202 in the prior art sequence is to perform an arithmetic-right-shift of the original dividend by (N-1) into a temporary register. This will produce (N-1) copies of the sign bit in the (N-1) high-order bits of the temporary register. In the next step 204, the value from step 202 is then logically-right-shifted by (S+1-N), where S is the number of bits in the temporary register. Step 204 produces (N-1) copies of the sign bit in the (N-1) low order bits of the temporary register. In the next step 206, this value is then added to the original dividend. In the final step 208, the result from step 206 is right-shifted by N to give the correct result in the event of a negative dividend.

This sequence has the advantage over branch logic in that it does not incur the risk of mispredicting a branch when choosing between the sequence pertaining to the negative dividend and the sequence pertaining to the positive dividend. Branches present a risk that, in the event a branch prediction is incorrect, time may be lost in recovering from the incorrectly predicted branch. However, the sequence of FIG. 2 is still limited by the clock cycles associated with the serial execution of each instruction (e.g., four cycles in the above example).

SUMMARY OF THE INVENTION

A method and apparatus are provided to divide a signed integer by a constant power of two using conditionally-executed instructions to choose between a first result in the event that the dividend is a negative signed integer and a second result in the event that the dividend is a positive signed integer, wherein values associated with the first result and the second result are generated simultaneously.

DETAILED DESCRIPTION OF THE PREFERRED EMBODIMENT

Figure 3:
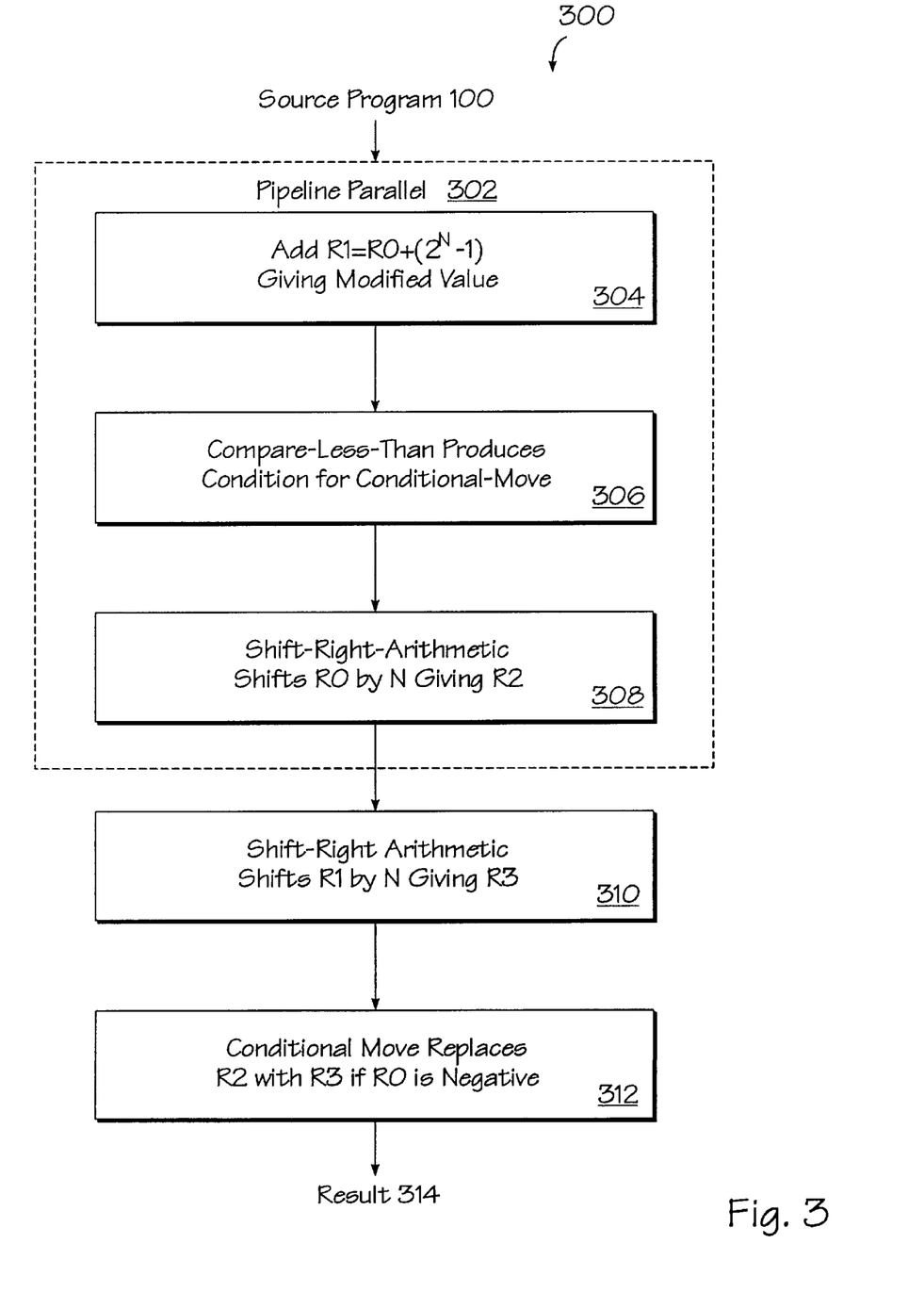
FIG. 3 is a flow chart of a method to divide a signed integer by a power of two according to one embodiment of the present invention.
Figure 4:
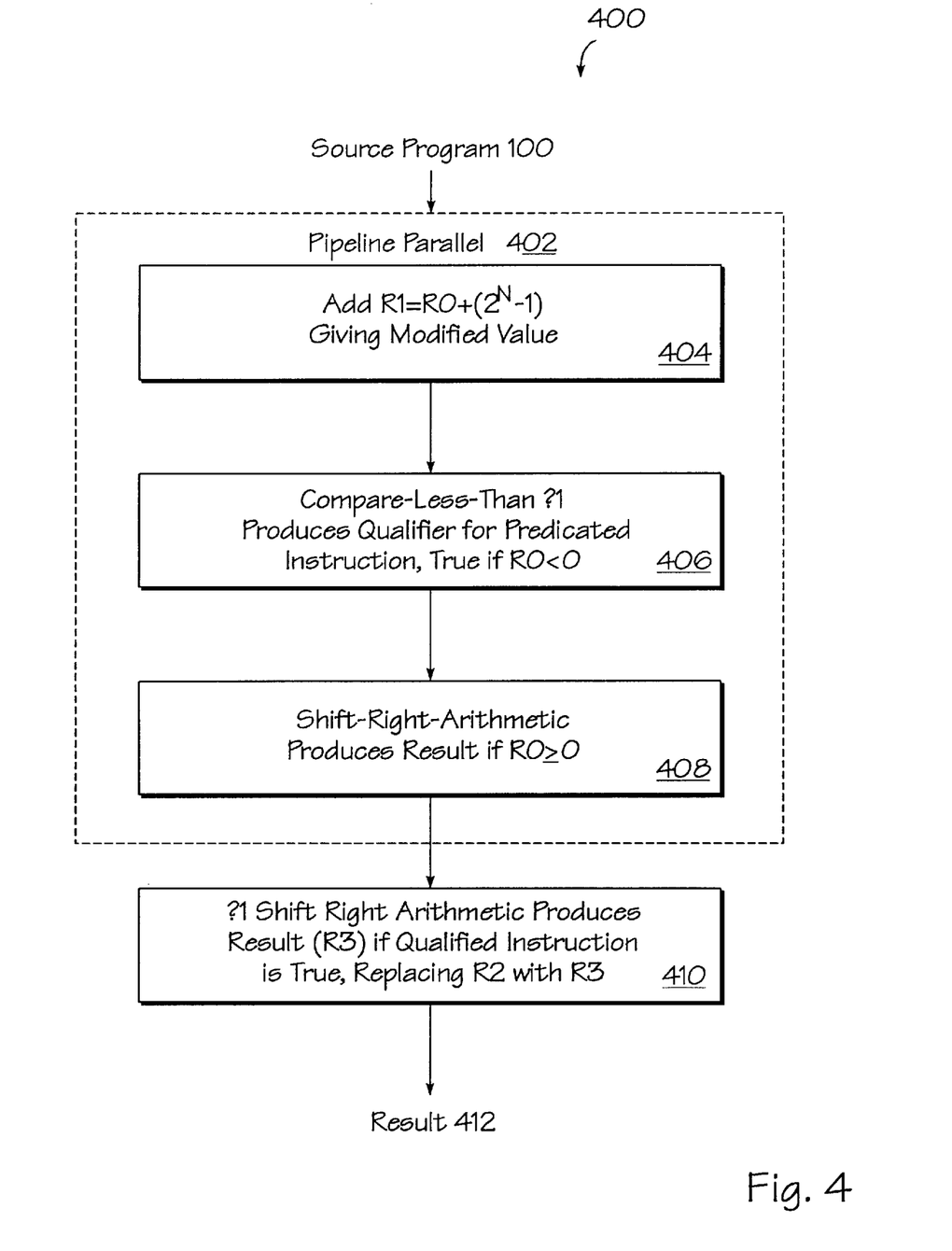
FIG. 4 is a flow diagram illustrating a method to divide a signed integer by a power of two according to one embodiment of the present invention.
Figure 5:
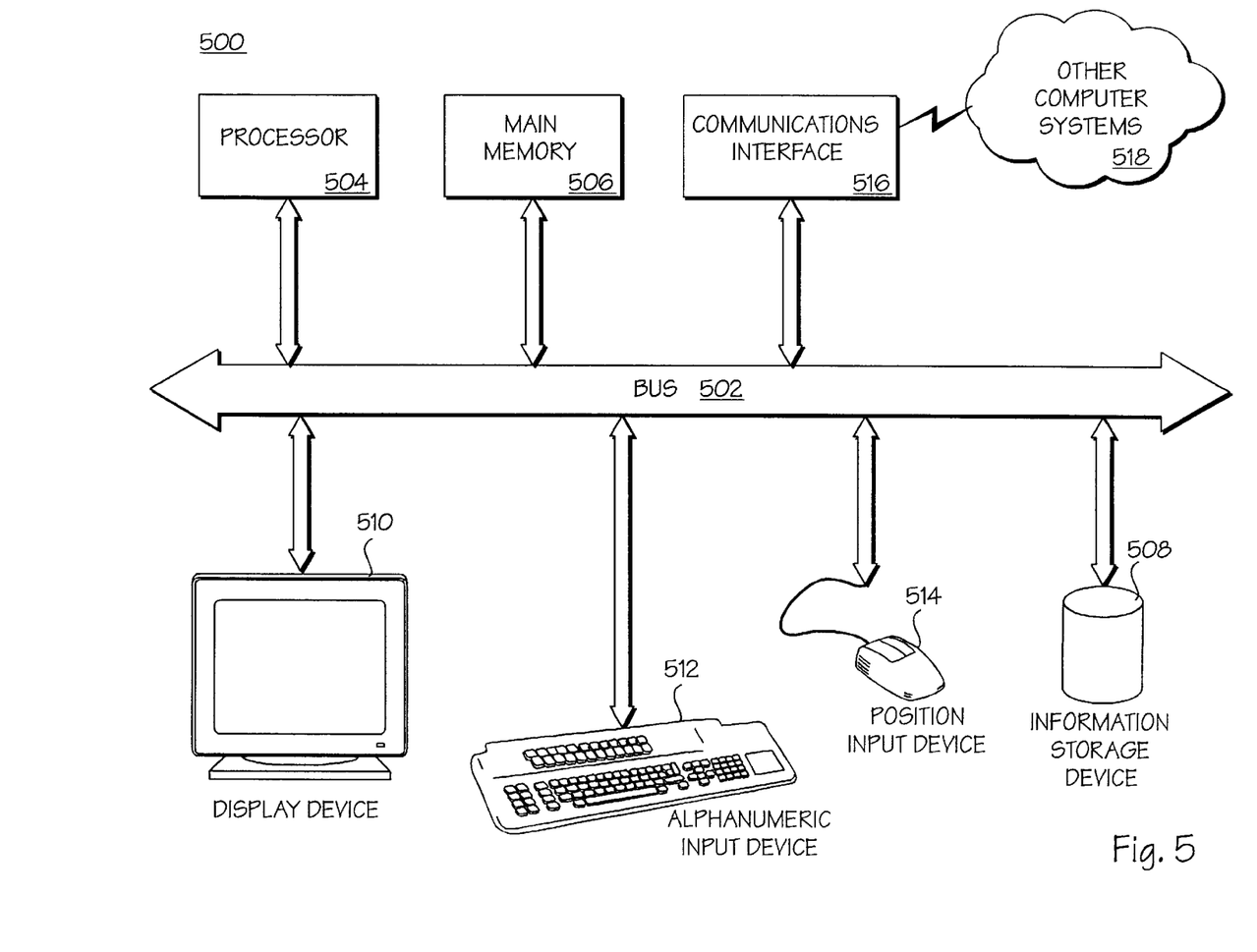
FIG. 5 is an architectural block diagram of an example of a programmable computer system within which various embodiments of the present invention can operate.

FIGS. 3 through 5 of the drawings disclose various embodiments of the present invention for purposes of illustration. One skilled in the art, however, will recognize alternative embodiments that may be implemented in a system without departing from the principles of the invention that are illustrated by the structures and methods described herein.

Referring again to FIG. 1, the present invention utilizes concepts embodied in a conventional compiler used to reduce a source program 100 to a machine executable code 104 for use in a computer hardware system 106. Generally, the present invention utilizes the registers 108 for storing results from several steps of the sequence used to divide a signed integer by a power of two in temporary registers so that these results may be simultaneously produced.

The present invention also utilizes the well known technique of pipelining in a computer system in order to produce data in parallel fashion so that the multiple blocks of data can be available simultaneously. Pipelining of information in modern computer systems is well known in the art for streamlining and speeding performance of modern computers. It will be appreciated by those skilled in the art that various methods of pipelining may be used to implement the present invention and, therefore, the use of different methods of pipelining in implementing the present invention would not depart from the spirit or scope of the present invention.

Now referring to FIG. 3, a sequence utilizing one embodiment of the present invention is illustrated by a flow diagram of a conditional-move sequence 300. The pipelined parallel steps 302 are steps that are produced in parallel and stored in temporary registers 108 of FIG. 1 for later use of the sequence. The first step 304 produces a modified value of a dividend from the source program that will be used in the event that the dividend turns out to be a negative signed integer. The dividend R0 is modified by adding to it a dividing factor ($2^N-1$) to generate a modified value R1. This value will be later shifted by N in the event that the dividend turns out to be a negative signed integer. The next step 306 is a compare-less-than sequence that produces a condition for a conditional-move instruction. The conditional-move instruction, generally, is an instruction produced with a flag associated with the instruction that indicates whether or not the instruction will be executed. In the event that the dividend from the source program 100 turns out to be a negative signed integer, the conditional-move instruction will have a true flag indicating that the condition is true and that the dividend is a negative signed integer, it will then transmit a shifted value R3, which represents a shifted value of R1, as the final result 314 discussed below. Processors such as the Pentium-Pro™, produced by Intel Corporation of Santa Clara, Calif., utilize conditional move instructions.

The next step 308 forms a shift-right-arithmetic operation that shifts R0 by N to generate R2. R2 will be the value passed on as the final result 314 in the event that the dividend is a positive signed integer. Again, the three values from 304, 306, 308 are produced simultaneously and stored in temporary registers for use later on in the sequence.

The next step 310 performs a shift-right-arithmetic operation that shifts the modified dividend R1 by N, yielding R3. This value will be transmitted as the final result 314 in the event that the dividend turns out to be a positive signed integer. The value resulting from step 310 is stored in a temporary register.

The final step 312 involves the execution or non-execution of the conditional-move instruction produced in step 306. In the event the dividend is a positive signed integer, the conditional move instruction is not executed and the value R2 from 308 remains in the temporary register as the final result. If, however, the conditional-move instruction indicates a true flag, indicating that the dividend is a negative signed integer, the positive dividend result R2 is replaced with a negative dividend result R3 by the execution of the conditional move instruction. R3 is then transmitted as the final result 314.

Referring now to FIG. 4, a flow diagram illustrating a second embodiment of the present invention is shown. This method takes advantage of a processor that recognizes qualifying predicates associated with instructions. Predicated execution is the conditional execution of an instruction under the control of a predicate. By conditionally executing all instructions in a piece of code under guard of a condition, instead of requiring change of control flow, predication effectively eliminates branches from the code. This is beneficial on wide and deep pipelines where the affect of flushes due to branch mispredictions can cause losses of instructions, known in the art as "bubbles," in the execution pipeline. This gives rise to a large opportunity loss of instructions that could have been executed. In essence, predication converts a control dependent branch condition into a data dependent predicate bit.

For example, a processor architecture may define a 64-entry predicate register file consisting of one bit predicates. These predicates may be written by the results of compare operations, or other means. The execution of most operations may be guarded by a controlling predicate. The guard can be specified on a third source specifier by each operation.

Those skilled in the art will appreciate the concept and application of qualifying predicates in executing codes in a microprocessor and that many methods of utilizing qualifying predicates exist. Accordingly, no particular method of applying qualifying predicates in utilizing the present invention should limit the scope and spirit of the present invention as described and claimed herein.

In the embodiment of FIG. 4, three instructions are produced in a pipelined parallel sequence 402 so that each value from steps 404, 406, 408 is available later in the sequence. The first step 404, produces the same modified value as step 304 of FIG. 3 giving R1=R0+($2^N-1$). This is the modified value of the original dividend R0 that can be shifted by N giving a correct results in the event that the dividend is a negative signed integer. The next step 406 is a compare-less-than (?1) that produces a qualifier for a predicated instruction. This step produces a qualifying predicate that determines whether the original dividend R0 is a negative signed integer, indicated by a true predicate. In the event that the dividend is a negative signed integer, the instruction having a qualifying predicate will be executed as discussed in step 410 below. The third and final step in the pipeline parallel sequence 402 is the shift-right-arithmetic step 408 that will produce the correct results, R0 shifted by N, in the event that the original dividend R0 is a positive signed integer. This result is stored in a temporary register and is transmitted as the final result 412 in the event that the original dividend is indeed a positive signed integer. These three steps 404, 406, 408 are produced in the first cycle for use in the second clock cycle of the sequence for the predicated instruction 400.

The final step, the first and only step in the second clock cycle of the sequence for the predicated instruction 400, is the execution or non-execution of the instruction with the qualifying predicate. In the event that the condition of the qualifying predicate is true, a shift-right-arithmetic is performed on the modified negative dividend value R1 producing result R3 and replacing R2, the value calculated for use in the event that the dividend is a positive sign integer, with R3, the value produced by shifting R1 by N in the event that the dividend is a negative signed integer.

FIG. 5 is an architectural block diagram of an example programmable computer system 500 within which various embodiments of the present invention can operate. Computer system 500 typically includes a bus 502 for communicating information, such as instructions and data. The system further includes a central processing unit (CPU) 504, coupled to bus 502, for processing information according to programmed instructions, a main memory 506 coupled to bus 502 for storing information for CPU 504, and a data storage device 808 coupled with bus 502 for storing information. In the case of a desk-top design for computer system 500, the above components are typically located within a chassis (not shown).

Processor 504 could be an 80960, 386, 486 or, Pentium™, Pentium-Pro™ compatible processor made by Intel Corp., among others. Main memory 506 could be a random access memory (RAM) to store dynamic information for processor 504, a read-only memory (ROM) to store static information and instructions for processor 504, or a combination of both types of memory.

In alternative designs for computer system 500, data storage device 508 could be any medium for storage of computer readable information. Suitable candidates include a read-only memory (ROM), a hard disk drive, a disk drive with removable media (e.g. a floppy magnetic disk or an optical disk), or a tape drive with removable media (e.g. magnetic tape), synchronous DRAM or a flash memory (i.e. a disk-like storage device implemented with flash semiconductor memory). A combination of these, or other devices that support reading or writing computer readable media, could be used.

The input/output devices of computer system 500 typically comprise display device 510, alphanumeric input device 512, position input device 514 and communications interface 516, each of which is coupled to bus 502. If data storage device 508 supports removable media, such as a floppy disk, it may also be considered an input/output device.

Display device 510 may be a liquid crystal display, a cathode ray tube, or any other device suitable for creating graphic images or alphanumeric characters recognizable to the user. Communication interface 516 communicates information between other computer systems 518 and processor 504 or main memory 506.

Alphanumeric input device 512 typically is a keyboard with alphabetic, numeric and function keys, but it may be a touch sensitive screen or other device operable to input alphabetic or numeric characters.

Position input device 514 allows a computer user to input command selections, such as button presses, and two dimensional movement, such as of a visible symbol, pointer or cursor on display device 510. Position input device 514 typically is a mouse or trackball, but any device may be used that supports signaling intended movement of a user-specified direction or amount, such as a joystick or special keys or key sequence commands on alphanumeric input device 512.

It will be clear to one skilled in the art that the compiler/linker tool set of the present invention can operate upon a wide range of programmable computer systems, not just example computer system 500.

From the above description, it will be apparent that the invention disclosed herein provides a novel and advantageous apparatus and method for performing a signed integer divide by a power of two. As will be understood by those familiar with the art, the invention may be embodied in other specific forms without departing from its spirit or essential characteristics, and thus, the described embodiment is not restrictive of the scope of the invention, and all variations which come within the meaning and range of equivalency of the claims are to be embraced within their scope.

What is claimed:

1. A machine-implemented method for dividing a signed integer by a constant power of two, said method comprising:

providing an input number (R0), which comprises a signed integer, to be divided;

simultaneously producing a first result (R1) pertaining to a case wherein R0 is negative input number, producing an associated conditionally executed instruction configured to transmit the first result as the final result if the input number is negative, and producing a second result (R2) pertaining to a case wherein R0 is a positive number; and if the input number is negative, executing the instruction.

2. A method according to claim 1, wherein producing the first result includes producing $R1=R0+((2^N)-1)$, wherein N is a dividing factor, and wherein producing the second result includes performing a shift-right arithmetic of R0 by N.

3. A method according to claim 2 wherein producing the associated conditionally executed instruction includes producing an instruction having a qualifying predicate which, if executed, executes the conditionally executed instruction which simultaneously shifts R1 by N to provide a third result (R3) and transmits R3 as a final result.

4. A method according to claim 3 wherein the second result (R2) is produced in a register and wherein the qualifying predicate replaces R2 with R3 in the register.

5. A method according to claim 2, further comprising:

performing a shift-right-arithmetic on R1 by N giving a third result (R3);

wherein producing an associated conditionally executed instruction includes producing a conditional move instruction which, if executed, replaces R2 with R3.

6. A method of dividing a signed integer by a constant power of two comprising:

providing an input number (R0) to be divided;

providing a dividing factor (N) for the signed integer;

in a first clock cycle:

producing a first result (R1) pertaining to a negative input number where $R1=R0+((2_N)-1)$;

producing a qualifying predicate for an instruction that shifts R1 by N to provide a final result (R3) and transmits the first result as a final result if the input number R0 is negative; and producing a second result (R2) pertaining to a positive number by executing an arithmetic right-shift of the input number R0 by N.

7. A computer system comprising:

a microprocessor; and a compiler to compile instructions to divide a signed integer by a constant power of two in two clock cycles using instructions having qualifying predicates, the compiler including:

a first input to receive an input number (R0) to be divided;

a second input to receive a dividing factor (N) for the signed integer;

a divider to simultaneously produce a first result (R1) pertaining to a negative input number, to produce an associated conditionally executed instruction to transmit the first result as a final result if the input number is negative and to produce a second result (R2) pertaining to a positive input number; and a qualifier to execute the instruction if the input number is negative.

8. A computer system according to claim 7, wherein the divider, in producing the first result, is operable to produce R1=R0+(($2^N$)−1) and, in producing the second result, performs a shift-right arithmetic of R0 by N to generate R2.

9. A computer system according to claim 8 wherein the divider, in producing an associated conditionally executed instruction, is operable to produce an instruction having a qualifying predicate which, if executed, allows execution of the conditionally executed instruction which simultaneously shifts R1 by N to generate a third result (R3) and transmits R3 as the final result.

10. A computer system according to claim 9, wherein production of an associated conditionally executed instruction includes production of a conditional move instruction which, if executed in the qualifier, replaces R2 with R3.

11. A mechanism to divide a signed integer by a constant power of two and said mechanism comprising:

a first input to receive an input number (R0) to be divided;

a second input to receive a dividing factor (N) for the signed integer;

a divider to simultaneously generate a first result (R1) pertaining to a negative input number, an associated conditionally executed instruction configured to transmit the first result as a final result if the input number is negative, and a second result (R2) pertaining to a positive input number; and a qualifier to execute the conditionally executed instruction if the input number is negative.

12. A compiler according to claim 11, wherein the divider is operable to produce R1=R0+(($2^N$)−1) and comprises a shifter to perform a shift-right arithmetic of R0 by N to generate R2.

13. A compiler according to claim 12 wherein the divider is operable to produce an instruction having a qualifying predicate which, if executed, allows execution of the conditionally executed instruction which simultaneously shifts R1 by N to generate a third result (R3) and transmits R3 as the final result.

14. A compiler according to claim 12, wherein the divider is operable to produce a conditional move instruction which, if executed in the qualifier, replaces R2 with a shifted value of R1.

15. A method for dividing a signed binary number, said method comprising:

generating in parallel a first value for said signed binary number, said first value representing a first modification of said signed binary number, and generating a second value representing a second modification of said signed binary number;

determining whether said signed binary number is positive or negative;

selecting a result associated with one of said first and second values, based on determining whether said signed binary number is positive or negative; and storing said result.

16. The method of claim 15, further comprising generating in parallel a conditional indication associated with said signed binary number, said conditional indication to be used for selecting one of said first and second values as said result.

17. The method of claim 15, wherein generating said first value includes adding an offset value to said signed binary number.

18. The method of claim 15, wherein generating said second value includes shifting said signed binary number.

19. The method of claim 16, wherein said conditional indication is associated with a compare instruction flag to indicate whether said signed binary number is positive or negative.

20. A computer-readable medium having stored thereon a set of processor-executable instructions, which, when executed by a processor, cause said processor to perform a method for dividing a signed binary number, said method comprising:

generating in parallel a first value for said signed binary number, said first value representing a first modification of said signed binary number, and generating a second value representing a second modification of said signed binary number;

determining whether said signed binary number is positive or negative;

selecting a result associated with one of said first and second values, based on determining whether said signed binary number is positive or negative; and storing said selected result.

21. The computer-readable medium of claim 20, wherein the step of determining whether said signed binary number is positive or negative includes generating a conditional indication associated with said signed binary number, said conditional indication is used in the step of selecting one of said first and second values as said result.

22. The computer-readable medium of claim 21, wherein the step of generating a conditional indication associated with said binary number is performed in parallel with the step of generating the first value and second value.

23. The computer-readable medium of claim 20, wherein generating said first value includes adding an offset value to said signed binary number.

24. The computer-readable medium of claim 20, wherein generating said second value includes shifting said signed binary number.

25. A computer system comprising:

a memory device;

a bus coupled to the memory device; and a processor, said processor coupled to the bus, said processor generates in parallel a first value for said signed binary number, said first value representing a first modification of said signed binary number, and generates a second value representing a second modification of said signed binary number, said processor determines whether said signed binary number is positive or negative; and said processor selects a result associated with one of said first and second values, based on determining whether said signed binary number is positive or negative.

26. The computer system of claim 25, wherein the processor further generates a conditional indication associated with the signed binary number, the conditional indication is used by processor to select one of said first and second values as said result.

27. The computer system of claim 26, wherein the processor generates the conditional indication in parallel with the generating the first value and generating the second value.

28. The computer system of claim 26, wherein processor adds an offset value to the signed binary number to generate the first value.

29. The computer system of claim 26, wherein the processor shifts said signed binary number to generate said second value.

30. A computer-readable medium, having stored thereon a first set of instructions, the first set of instructions, which when executed by a processor, generate a second set of instructions through a compilation process, the second set of instructions, which when executed by the processor, cause said processor to perform a method comprising:

generating in parallel a first value for said signed binary number, said first value representing a first modification of said signed binary number, and generating a second value representing a second modification of said signed binary number;

determining whether said signed binary number is positive or negative;

selecting a result associated with one of said first and second values, based on determining whether said signed binary number is positive or negative; and storing said selected result.

31. The computer-readable medium of claim 30, wherein the step of determining whether said signed binary number is positive or negative includes generating a conditional indication associated with said signed binary number, said conditional indication is used in the step of selecting one of said first and second values as said result.

32. The computer-readable medium of claim 31, wherein the step of generating a conditional indication associated with said binary number is performed in parallel with the step of generating the first value and second value.

33. The computer-readable medium of claim 31, wherein generating said first value includes adding an offset value to said signed binary number.

34. The computer-readable medium of claim 31, wherein generating said second value includes shifting said signed binary number.

* * * * *